United States Patent

Smith

[15] 3,673,573

[45] June 27, 1972

[54] COMPUTER WITH PROGRAM TRACING FACILITY

[72] Inventor: Richard Deming Smith, Northborough, Mass.

[73] Assignee: RCA Corporation

[22] Filed: Sept. 11, 1970

[21] Appl. No.: 71,455

[52] U.S. Cl. ....................340/172.5

[51] Int. Cl. ....................G06f 9/18

[58] Field of Search ....................340/172.5; 235/157

[56] References Cited

UNITED STATES PATENTS

| | | | |
|---|---|---|---|
| 3,551,895 | 12/1970 | Driscoll | 340/172.5 |
| 3,573,854 | 4/1971 | Watson et al. | 340/172.5 |
| 3,551,659 | 12/1970 | Forsythe | 340/172.5 |
| 3,213,427 | 10/1965 | Schmitt et al. | 340/172.5 |
| 3,573,853 | 4/1971 | Watson et al. | 340/172.5 |
| 3,570,006 | 3/1971 | Hoff et al. | 340/172.5 |

*Primary Examiner*—Paul J. Henon
*Assistant Examiner*—Mark Edward Nusbaum
*Attorney*—H. Christoffersen

[57] ABSTRACT

A computer system is disclosed which includes means operative during the execution of a program to record the addresses of all of the branch instructions which result in the taking of the branch path specified by the instruction. The record of addresses is useful in program debugging procedures for determining the place in a program at which an error occurred.

4 Claims, 2 Drawing Figures

INVENTOR.
Richard D. Smith
BY Carl V. Olson
ATTORNEY

INVENTOR.
Richard D. Smith
BY Carl V. Olson
ATTORNEY

COMPUTER WITH PROGRAM TRACING FACILITY

BACKGROUND OF THE INVENTION

A program is a list of instructions which are normally accessed and executed in sequence. However, many instructions are branch instructions which call for the testing of certain conditions and either proceeding to the next instruction in sequence or branching to a non-sequential instruction. When debugging a program to determine where errors occurred, it is often necessary to know the actual paths taken in the execution of the program. It is therefore a general object of this invention to provide means for recording the addresses of branch instructions following which a branch path was taken so that it is possible to trace back through the instructions which were executed to find the place where an error occurred.

A computer is normally constructed to include an interrupt system by which the program being executed can be interrupted for any one of many reasons. The program being executed may include instructions which make appropriate comparisons and conditionally set an interrupt flag which later results in an interruption of the program and the entering of a debugging routine. It is another object of this invention to provide a running record of a limited number of the addresses of branch instructions following which a branch was taken in the execution of a program, and which a debugging routine can periodically collect and print out as a skip trace list of all branches taken in the execution of a program.

SUMMARY OF THE INVENTION

A branch address counter is added to a general purpose computer for containing memory addresses of an area in memory reserved for storing the addresses of branch instructions. When a branch instruction is present in the instruction register of the computer, and the resulting comparison determines that the branch is to be taken, the contents of the program counter in the computer are transferred to the location in the memory determined by the address in the branch address counter, the branch address counter is incremented, and all "1"s are written into the memory at the location determined by the incremented branch address counter. The area in memory thus accumulates the addresses of all branch instructions which result in the branch being taken.

DESCRIPTION OF THE PREFERRED EMBODIMENT

Figure 1:
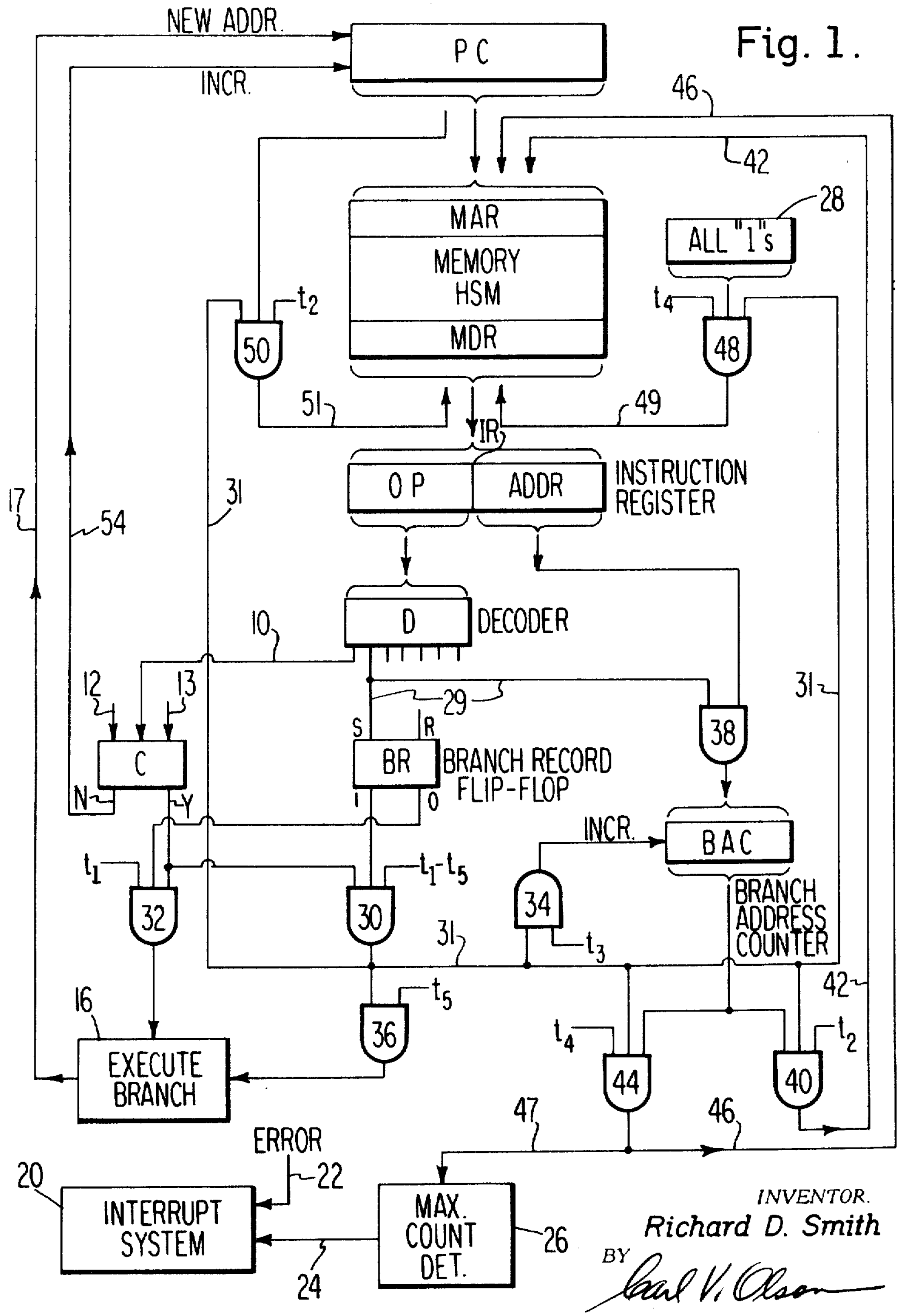
FIG. 1 is a diagram of a portion of a computer system including means to record the addresses of branch instructions.

Referring now in greater detail to FIG. 1, there is shown that portion of a conventional general purpose computer which is pertinent to an understanding of the present invention. The computer includes a high speed memory HSM having a memory address register MAR and a memory data register MDR. A program counter PC contains memory addresses which are successively applied to the memory address register MAR to access instructions stored in memory HSM. Instructions read from the memory HSM are applied from the memory data register MDR to an instruction register IR having operation code portion OP and an address portion ADDR. The contents of the operation portion of the instruction register IR is applied to a decoder D having many individual outputs each corresponding to a respective instruction. One of the outputs 10 from the decoder D is energized when the instruction in the instruction register IR is a branch instruction.

The conventional general purpose computer also includes a comparator C which is activated over line 10, which has condition comparison inputs 12 and 13 from logic circuits not shown, and has a "no" output N and a "yes" output Y. A unit

16 contains the usual logic for effecting a branch by transferring an address from the instruction register IR over lines 17 as a new address to the program counter PC. The unit 16 may comprise "and" which are receptive to the contents of the address portion of instruction register IR, and which are enabled by a signal from gate 32 or gate 36. The computer includes a conventional interrupt system 20 including a flag register having bits that may be set in response to the occurrence of an error or any one of many other respective causes for interruption of the program being executed. The interrupt system 20, which may be as described in U.S. Pat. No. 3,290,658 issued on Dec. 6, 1966, on an "Electronic Computer with Interrupt Facility", also includes a mask register which may be set to control the priorities of various causes of interruption. Interruption may be requested by an error signal on line 22 or by an output 24 from a maximum count detector or comparator 26. The conventional computer also includes a source 28 of a computer word containing all "1"s.

In addition to the above-described conventional components, the system embodying the invention includes a branch record flip-flop BR, and a branch address counter BAC. The branch record flip-flop BR has a set input S coupled to an output 29 from the decoder D, and has a "one" output and an inverted or "zero" output. An "AND" gate 30 has inputs coupled to the "one" output of flip-flop BR and to the output Y of comparator C. An "AND" gate 32 has inputs coupled to the "zero" output of flip-flop BR and the output Y of comparator C. An "AND" gate 34 has an input coupled to the output of gate 30, and has an output connected to the incrementing input of the branch address counter BAC. An "AND" gate 36 has an input coupled to the output of gate 30 and an output coupled to the logic 16 used in executing branch instructions.

An "AND" gate 38 has an input connected to the output 29 of decoder D, has an input coupled to the address portion ADDR of the instruction register IR, and has an output coupled to the counter BAC. While the gate 38 is represented by a single symbol, the gate symbol represents a set of gates equal in number to the number of bits in the address portion of the instruction register IR. The gates 38 therefore permit the transfer of the entire contents of the address portion of the instruction register to the branch address portion of the instruction register to the branch address counter BAC when the gates are enabled by an output on line 29 from the decoder D.

A set of gates 40 (one shown) is connected to be enabled from the output of gate 30 for the transfer of the contents of the branch address counter BAC over lines 42 to the memory address register MAR. A set of "AND" gates 44 are connected to be enabled at a later time for the transfer of the contents of the counter BAC over lines 46 to the memory address register MAR. The gate 44 also conveys the contents of counter BAC over lines 47 to the maximum count detector 26. A set of "AND" gates 48 is connected to transfer the all "1"s word from unit 28 over lines 49 to the memory data register MDR when gates 48 are enabled by the output of gate 30. A set of "AND" gates 50 is connected to operate under the control of the output of gate 30 to transfer the contents of the program counter PC over lines 51 to the memory data register MDR.

OPERATION

Figure 2:
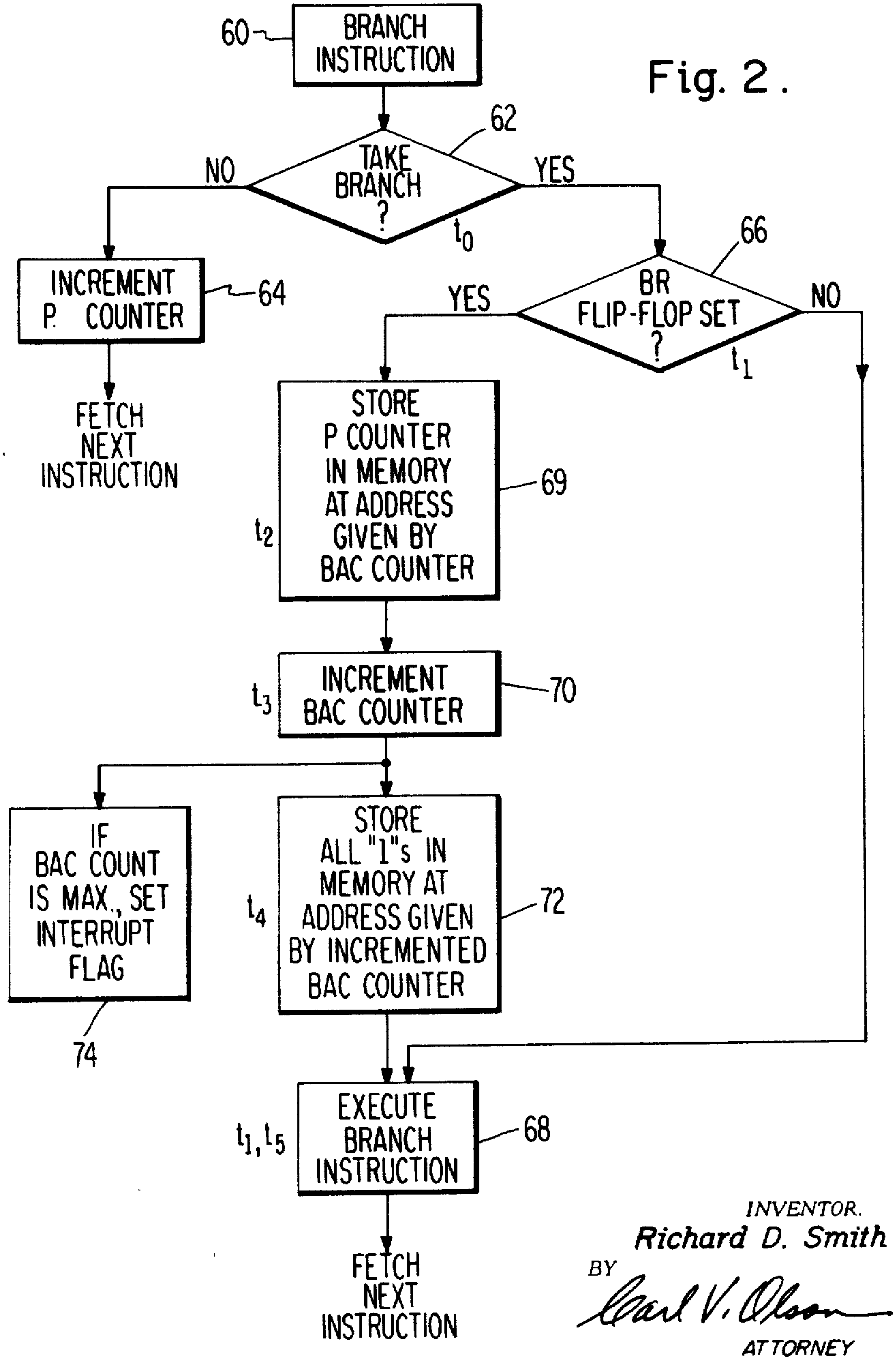
FIG. 2 is a flow chart which will be referred to in describing the operation of the system of FIG. 1.

The operation of the system of FIG. 1 will now be described with references to the flow chart of FIG. 2, and starting with the normal condition in which the branch record flip-flop BR is reset and the computer operates without recording the addresses of branch instructions.

When a branch instruction 60 (FIG. 2) is encountered, the operation code portion of the instruction is decoded by decoder D which provides an output over line 10 to the comparator C. At time $t_0$ the comparator makes a comparison 62 of the signals at its inputs 12 and 13 as specified by the instruction and provides either a "no" output or a "yes" output. If the comparator C provides a "no" output on its output line N, meaning that the branch will not be taken, the output of the comparator is applied over line 54 to increment 64 the program counter PC. The program counter then accesses the next numerically successive instruction and proceeds with the program without taking the branch path.

On the other hand, if the comparator C provides a "yes" output, indicating that the branch path will be taken, the output Y of the comparator is applied to inputs of gates 30 and 32. This results in a comparison 66 being made to determine whether the branch record flip-flop BR is set or reset. At this point, flip-flop BR is in its reset condition and its outputs disable gate 30 and enable gate 32. Therefore, at time $t_1$, the output of gate 32 activates the logic unit 16 to complete the execution 68 of the branch instruction by transferring the address of the branch instruction to the program counter PC without recording the address of the branch instruction.

It is now assumed that an instruction is encountered which has been included in the program by a programmer for the purpose of thereafter recording the addresses of all branch instructions which result in the branch being taken. This conditioning instruction is accessed from the memory HSM and applied from the memory data register MDR to the instruction register IR. The operation portion OP, when applied to the decoder D, energizes the decoder output 28 and sets the branch record flip-flop BR. (The flip-flop BR remains in its "-set" state throughout all of the following operations and until such time as an instruction is encountered which resets the flip-flop and thereby discontinues the recording of branch addresses). The decoder output 28 also enables the gates 38 which transfer an initial memory address from the address portion ADDR of the instruction to the branch address counter BAC. The counter BAC then contains the initial address of an area in memory HSM which is reserved for the accumulation of the addresses of subsequently-encountered branch instructions which result in the branch path being taken.

The next following instruction is then accessed by the program counter PC and the computer proceeds with the execution of the successive instructions in the program.

When a branch instruction 60 is now encountered and the comparator C makes a comparison 62 resulting in the conclusion that the branch will not be taken, there is an incrementing 64 of the program counter PC, as has been previously described. The program counter then accesses the next numerically-successive instruction and proceeds with the program without taking the branch path.

On the other hand, if the comparator C makes a comparison 62 resulting in a "yes" output, indicating that the branch path will be taken, the output Y of the comparator is applied to inputs of gates 30 and 32 where a determination 66 (FIG. 2) of the state of the branch record flip-flop BR is made. Since the flip-flop BR is now in its set state, its "zero" output disables gate 32, and its "one" output enables gate 30.

Gate 30, which has input signals from the comparator C and the flip-flop BR, is enabled by a timing signal having duration starting at a time $t_1$ and extending through a time $t_5$. The gate 30 thus provides an output on the output bus 31 which continues during the time period $t_1$ through $t_5$.

At time $t_2$, gates 40 are enabled from bus 31 to transfer the contents of the branch address counter BAC over lines 42 to the memory address register MAR. At the same time $t_2$, the gates 50, also enabled from bus 31, pass the contents of the program counter PC over lines 51 to the memory data register MDR. In this way, as shown at 69 in FIG. 2, the address of the branch instruction is transferred from the program counter PC to the initial location in memory HSM specified by the initial count in the branch address counter BAC.

At time $t_3$, gate 34 is enabled from bus 31 to accomplish the incrementing 70 of the counter BAC. The counter BAC then contains the next successive address in the area of memory reserved for storing addresses of branch instructions.

At time $t_4$, gates 44 are energized to transfer the incremented address in counter BAC over lines 46 to the memory address register MAR. At the same time $t_4$, gates 48 are enabled to transfer the all "1"s word from source 28 over lines 49 to the memory data register MDR. Therefore, as indicated at 72, all "1"s are stored in memory at the location specified by the incremented address in counter BAC. The all "1"s contents of this location in memory serve as a marker identifying the location of the last branch instruction address which was recorded, for use by a program debugging routine.

At time $t_4$, the incremented contents of counter BAC are also applied through gates 44 over leads 47 to the maximum count detector 26. If the detector 26 determines that the reserved area in memory is exhausted, the detector acts over line 24 to set a corresponding interrupt flag in the interrupt system 20. These functions are represented at 74 in FIG. 2. The interrupt system may then enter into a routine designed to transfer the contents of the reserved area of memory to a larger storage means for subsequent print out and analysis.

At time $t_5$, the address recording procedures have been completed, and gate 36 signals the logic unit 16 to complete the execution 68 of the branch instruction by supplying the address of the instruction specified by the branch instruction over lines 17 to the program counter PC.

The computer then proceeds with the execution of successive instructions in the normal manner until another branch instruction is encountered. The handling of the encountered branch instruction is then the same as has been described. In this way, the reserved area in memory is successively filled with the addresses of branch instructions which result in taking the branch paths. If at any time, during the operation of the system, a program error is detected which sets a program debugging flag in the interrupt system 20, the resulting debugging routine can analyze the contents of the reserved area in memory to trace the paths taken through the program and determine where the programing error exists. This very useful function is accomplished in a general purpose computer without any significant increase in the time required to execute a program. The desirable results are achieved at the cost of a very minor addition to the computer hardware in the form of an additional flip-flop BR, an additional counter BAC, and a modest number of logic gates.

What is claimed is:

1. In a computer including a program counter, a memory, an instruction register, and a comparator responsive to machine conditions to determine whether a branch is to be taken, means to record the branches taken during the execution of a program, comprising a branch record flip-flop, a branch address counter for providing successive addresses of an area in memory, means controlled by program to set the branch record flip-flop, and load a beginning memory address in the branch address counter, and means operative when a branch instruction is present in said instruction register, and said comparator determines that the branch is to be taken, to transfer the contents of the program counter to the location in the memory determined by the address in said branch address counter, and to increment the branch address counter, whereby said area in memory accumulates the addresses of all branch instructions which result in a branch path being taken.

2. The combination as defined in claim 1 and, in addition, means to store all "1"s in the memory at the location determined by the contents of the branch address counter after said counter is incremented, whereby to provide a marker in memory for use in locating the last recorded branch instruction address.

3. The combination as defined in claim 1, and, in addition, a maximum count detector coupled to detect a maximum count in said branch address counter and provide an output signal when a predetermined maximum count is reached.

4. The combination as defined in claim 3 and, in addition, a program interrupt system responsive to the output signal from said maximum count detector.

* * * * *